UNITED STATES PATENT OFFICE.

JEAN URRUTY, OF COULON, FRANCE, ASSIGNOR TO LA SOCIÉTÉ URRUTY & CIE., OF PARIS, FRANCE.

DISINCRUSTANT FOR CLEANING CONDENSERS AND BOILERS.

1,371,584.   Specification of Letters Patent.   Patented Mar. 15, 1921.

No Drawing.   Application filed December 11, 1918. Serial No. 266,300.

*To all whom it may concern:*

Be it known that I, JEAN URRUTY, citizen of the Republic of France, and resident of Coulon, France, (post-office address 64 Rue Picot,) have invented a new and useful Disincrustant for Cleaning Condensers and Boilers, which improvements are fully set forth in the following specification.

The present invention relates to a composition of matter for use as a disincrustant.

The object of the present invention is a liquid for removing crust from condensers and boilers.

The liquid enables condensers and boilers to be cleaned without removing the tubes.

The liquid consists of a mixture of hydrochloric acid, copper sulfate, sodium bicarbonate, potassium cyanid and water, in any suitable proportions.

By way of example the following may be mentioned:—

| | |
|---|---|
| Hydrochloric acid | 500 grams. |
| Copper sulfate | 25 " |
| Sodium bicarbonate | 5 " |
| Potassium cyanid | 5 " |
| Water | 465 " |
| Total | 1000 grams. |

What I claim as new and desire to secure by Letters Patent of the United States is:—

A liquid composition of matter for use as a disincrustant for cleaning condensers and boilers formed from a mixture of 50% hydrochloric acid, 2.5% copper sulfate, 0.5% sodium bicarbonate, 0.5% potassium cyanid and 46.5% water.

In testimony whereof I have signed this specification in the presence of two subscribing witnesses.

JEAN URRUTY.

Witnesses:
 CHARLES MOITOSIC,
 VALENTIN GRAFFIGUER.